UNITED STATES PATENT OFFICE.

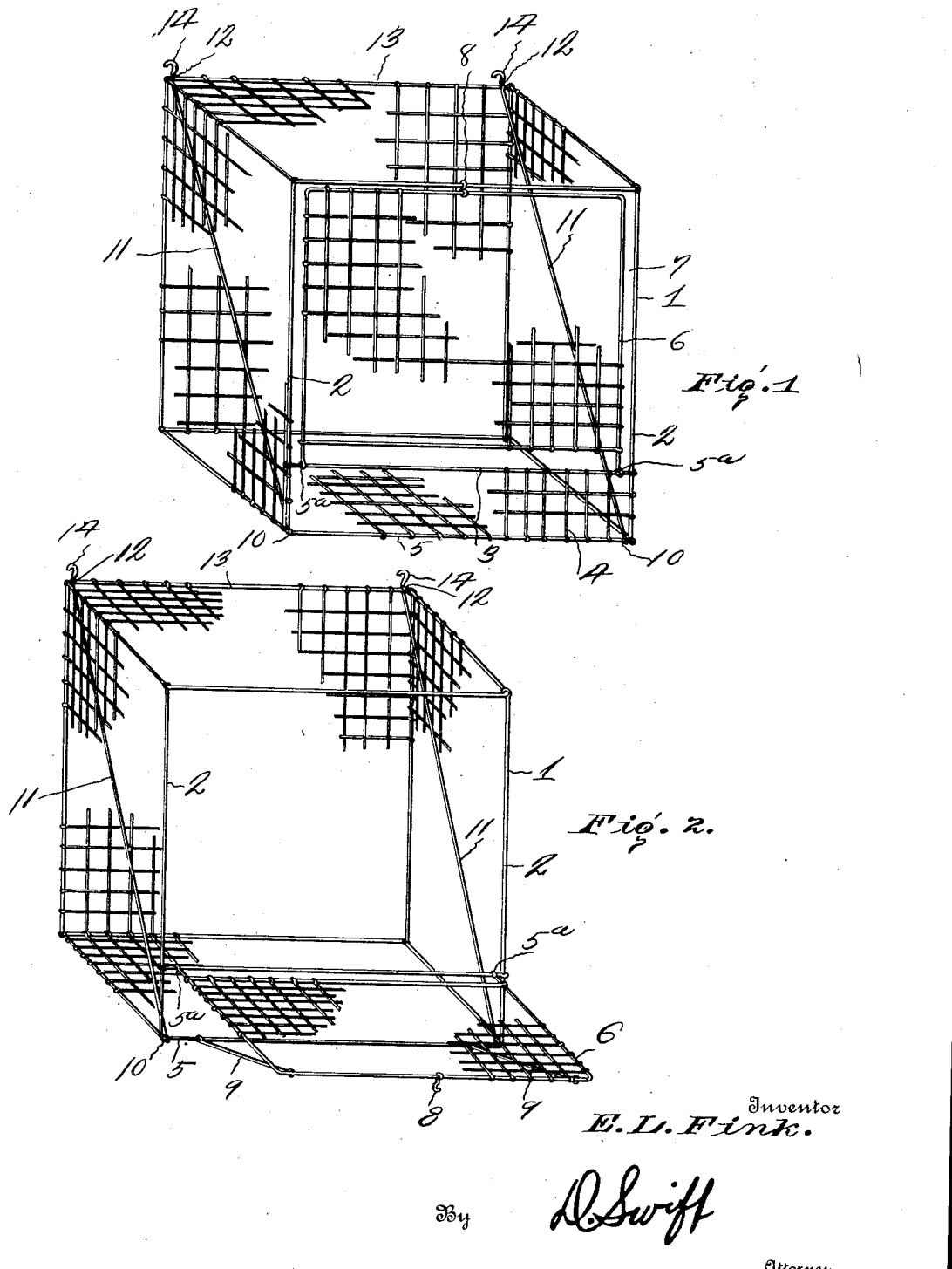

EUGENE L. FINK, OF DELOIT, IOWA.

HEN'S NEST.

1,347,266.  Specification of Letters Patent.  Patented July 20, 1920.

Application filed April 14, 1920. Serial No. 373,841.

*To all whom it may concern:*

Be it known that I, EUGENE L. FINK, a citizen of the United States, residing at Deloit, in the county of Crawford, State of Iowa, have invented a new and useful Hen's Nest; and I do hereby declare the following to be a full, clear, and exact description of the invention, such as will enable others skilled in the art to which it appertains to make and use the same.

The invention relates to hens' nests and has for its object to provide a device of this character formed from wire screening of a coarse mesh so as to reduce to a minimum places of lodgment for vermin and to provide a nest which may be easily and quickly detached and submerged in a solution for killing the vermin.

A further object is to provide a rectangular shaped nest formed from wire mesh material and to hingedly connect to a raised front wall a platform which may be swung upwardly for closing the entrance to the nest or maintained in a horizontal position and used as a platform.

A further object is to provide a hen's nest made from wire mesh which is coarse so that the nest as a whole after a setting hen has left the same may be placed in a fire for destroying the straw nest, which is usually full of vermin.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the nest showing parts of the screening broken away to better illustrate the frame construction.

Fig. 2 is a view similar to Fig. 1 but showing the closure supported in a horizontal plane so as to form a landing platform.

Referring to the drawings, the numeral 1 designates a rectangular shaped frame formed from heavy wire the sides of which also the top and bottom are closed by a coarse wire mesh so as to reduce to a minimum points of lodgment for vermin. The front vertical members 2 of the frame 1 are connected together by a horizontally disposed heavy wire 3, spaced from the bottom of the nest, there being a coarse wire mesh 4 connected to the wire 3, the vertical wires 2 and the wire 5. The purpose of the wire 3 is to form means for preventing the straw and portions of the bottom of the nest from coming out of the bottom of the nest. The wire 3 also forms a hinging point to which is hinged as at 5ª a closure 6, which closure closes the entrance 7 of the nest when desired and is held in closed position by a hook 8. The closure 6 also forms means whereby a platform may be formed as shown in Fig. 2 by means of brace wires 9, thereby forming a landing means on which the hens may land in entering or leaving the nest. If so desired the closure 6 may be allowed to hang downwardly against the front wall of the nest. Connected to the heavy wire 5 as at 10 are upwardly and rearwardly extending diagonally disposed brace wires 11, the upper ends of which are secured as at 12 to the heavy wire 13 of the frame 1, said wires 11 beyond the points 12 being provided with hooked ends 14 by means of which the nest as a whole may be supported from a wall, or from any other suitable support.

From the above it will be seen that a hen's nest is provided which may be easily and quickly placed in position and also one wherein the nest as a whole may be put in a fire and the vermin killed without damaging the nest.

The invention having been set forth what is claimed as new and useful is:—

1. A hen's nest comprising a rectangular shaped body, one wall of said body being provided with an entrance, a closure for said entrance, said closure being pivoted to the bottom of the entrance, means for supporting the closure in a horizontal position so as to form an entrance platform, diagonally disposed brace wires extending diagonally across the sides of the nest, the lower ends of said wires being connected to the lower wire of the front wall, the upper ends of said brace wires being twisted around the rear upper wire of the nest, the brace wires beyond said upper rear wire of the nest being formed into hooks forming means for supporting the nest as a whole.

2. A hen's nest comprising a rectangular shaped body, said body being formed from wire mesh, a wall of said body being provided with an entrance, a closure for said entrance formed from wire mesh, said closure being pivoted to the bottom of the entrance, means for supporting the closure in a horizontal position so as to form an entrance platform, diagonally disposed brace wires extending diagonally across the sides of the nest, the lower ends of said wires being connected to the lower wire of the front wall, the upper ends of said brace wires being twisted around the rear upper wire of the nest and extending upwardly from the same and bent into supporting hooks for supporting the nest.

In testimony whereof I have signed my name to this specification in the presence of two subscribing witnesses.

EUGENE L. FINK.

Witnesses:
WM. WORLEY,
ELLA MARTIN.